ized Patent No.: US 8,724,968 B2
(45) Date of Patent: May 13, 2014

(12) United States Patent
Gifford et al.

(54) EMBEDDED ANCILLARY DATA PROCESSING METHOD AND SYSTEM WITH PROGRAM DURATION ALTERATION

(75) Inventors: Christopher Scott Gifford, Nipomo, CA (US); Keith William Schindler, Nipomo, CA (US)

(73) Assignee: Prime Image Delaware, Inc., Chalfont, PA (US)

( * ) Notice: Subject to any disclaimer, the term of this patent is extended or adjusted under 35 U.S.C. 154(b) by 41 days.

(21) Appl. No.: 13/439,285

(22) Filed: Apr. 4, 2012

(65) Prior Publication Data

US 2013/0094836 A1 Apr. 18, 2013

Related U.S. Application Data

(60) Provisional application No. 61/472,850, filed on Apr. 7, 2011.

(51) Int. Cl.
*H04N 5/92* (2006.01)
*H04N 5/93* (2006.01)

(52) U.S. Cl.
USPC .......................................... 386/264; 386/248

(58) Field of Classification Search
CPC . H04N 7/088; H04N 5/04; H04N 21/234381; H04N 21/2355; H04N 21/242; H04N 5/85; H04N 9/8042; G11B 27/005; G11B 27/034
USPC .......... 386/248, 207, 245, 264, 201, 202, 203
See application file for complete search history.

(56) References Cited

U.S. PATENT DOCUMENTS

| | | | |
|---|---|---|---|
| 4,464,784 A | 8/1984 | Agnello | 381/61 |
| 4,757,540 A | 7/1988 | Davis | 381/34 |
| 5,023,888 A | 6/1991 | Bayston | 375/23 |
| 5,627,581 A | 5/1997 | Kondo | 348/17 |
| 5,995,153 A | 11/1999 | Moeller et al. | 348/439 |

(Continued)

FOREIGN PATENT DOCUMENTS

WO WO 2010/019409 A2 2/2010

OTHER PUBLICATIONS

International Preliminary Report on Patentability for International Appln. No. PCT/US2012/032274, mailed Oct. 17, 2013.
"International Search Report", mailed Jul. 18, 2012, PCT/US2012/032274.

*Primary Examiner* — Robert Chevalier
(74) *Attorney, Agent, or Firm* — Dergosits & Noah LLP

(57) ABSTRACT

The total running time of an original program signal, with related embedded ancillary data is altered to generate a time-shortened (or time-lengthened) program signal. The video signal embedded ancillary data packets are subject to separate processing without decoding payload text strings and caption information. The video portion of the original program signal is processed by deleting (or adding) individual frames on a manual, periodic or automatic basis. As fields or frames are removed (or added), corresponding ancillary data packets and text-based payload information are temporarily stored and analyzed such that data can be reassembled within the time-altered video program. Embedded circuitry determines the type of caption and subtitle information (HD/SD) and location within the Vertical Ancillary (VANC) and Horizontal Ancillary (HANC) packets for processing coupled with the original video signal. All captions, subtitles and text-based information associated with the original program signal are preserved and caption information is automatically aligned to the time-altered video signal.

16 Claims, 3 Drawing Sheets

(56) References Cited

U.S. PATENT DOCUMENTS

| | | |
|---|---|---|
| 6,026,232 A | 2/2000 | Yogeshwar et al. .......... 395/915 |
| 6,178,317 B1 | 1/2001 | Kroeger et al. ............... 455/296 |
| 6,353,632 B1 * | 3/2002 | Moeller et al. ........... 375/240.01 |
| 7,092,774 B1 | 8/2006 | Gifford et al. .................. 700/94 |
| 2002/0191956 A1 | 12/2002 | Morishima et al. ............. 386/52 |
| 2005/0231646 A1 | 10/2005 | Takahashi ..................... 348/714 |
| 2010/0247059 A1 | 9/2010 | Lee et al. ........................ 386/33 |

* cited by examiner

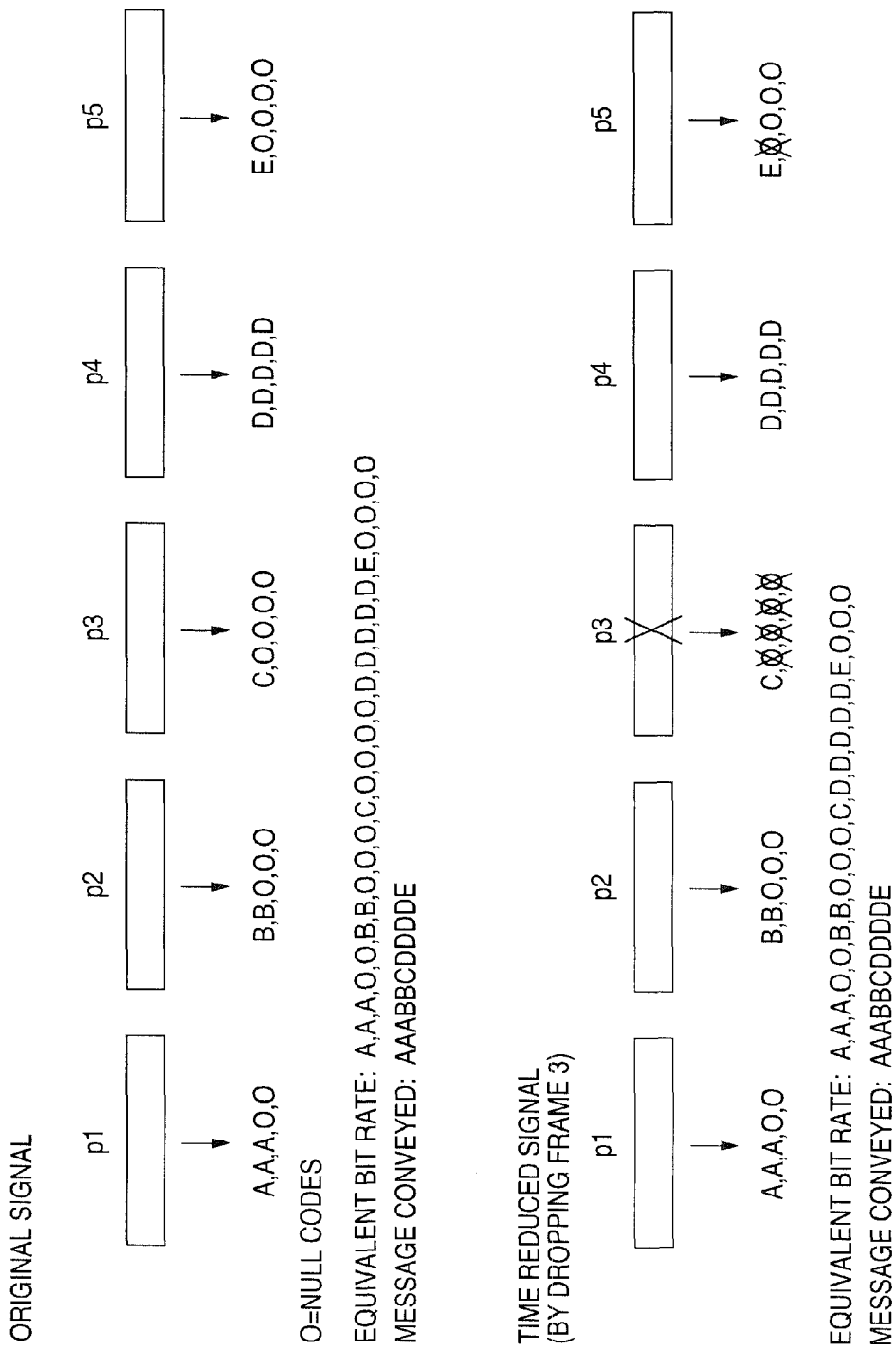

EMBEDDED ANCILLARY DATA PROCESSING METHOD AND SYSTEM WITH PROGRAM DURATION ALTERATION

PRIORITY CLAIM

This application claims the benefit of U.S. Provisional Patent Application No. 61/472,850, which was filed on Apr. 7, 2011, by Gifford et al. and titled "Embedded Ancillary Packet Data Processing System and Method With Real-Time Program Duration Alteration." Provisional Patent Application No. 472,850 is hereby incorporated by reference herein in its entirety.

FIELD OF THE INVENTION

The present invention relates to systems operable in real time and non-real-time to alter the running time of a video program signal and, in particular, to systems and methods suited to include ancillary data packets in a time-altered video program signal pursuant to government rules and regulations to support captions, subtitles and teletext.

BACKGROUND OF THE INVENTION

Audio/video signal processing systems (such as, for example, the Time Tailor systems available from Prime Image, having its corporate headquarters in Chalfont, Pa.) are known for editing the entire audio/video program material to either reduce or expand program run time. See U.S. Pat. No. 5,995,153, which issued on Nov. 30, 1999 and U.S. Pat. No. 7,092,774, which issued on Aug. 15, 2006. Both U.S. Pat. No. 5,995,153 and U.S. Pat. No. 7,092,774 are hereby incorporated by reference herein in their entirety to provide background information regarding the present invention.

A program or commercial break is often times pre-determined by the broadcaster. However, there are instances in which the broadcaster needs to make run time adjustments to the audio/video program material to meet specific traffic and play-out requirements. In these instances, broadcasters have suffered from not having an automated micro-editing time management solution that not only reduces or expands program run time to meet desired run length within a block of time, but also maintains synchronicity of embedded ancillary data, such as captions, subtitles and teletext, in the time-altered program material. As a result of this need, an automated micro-editing solution must support video, audio and ancillary data packets to be fully compliant with government rules and regulations to include captions, subtitles and other text-based data for the hearing impaired. The solution needs to dynamically time-adjust the audio and video program material, and also adjust and reassemble caption material based upon the time-altered audio/video program.

SUMMARY OF THE INVENTION

In an embodiment of the invention, the total running time of an original audio/video program signal that includes related embedded ancillary data is altered to generate a time-reduced (or time-expanded) program signal. The ancillary data packets embedded within the video signal are subject to separate processing without decoding payload text strings and caption information. The video portion of the original program signal is processed by deleting (or adding) individual fields or frames on a manual, periodic or automatic basis. As fields or frames are deleted (or added), corresponding ancillary data packets and text-based payload information are temporarily stored and analyzed such that data can be reassembled within the time-altered video signal. Embedded circuitry determines the type of caption and subtitle information (HD/SD) and its location within the Vertical Ancillary (VANC) and Horizontal Ancillary (HANC) packets for processing coupled with the original video/audio signal. All captions, subtitles and text-based information associated with the original video signal are preserved and automatically aligned to the newly time-altered video signal.

The features and advantages of the various embodiments of the invention disclosed herein will be more fully understood and appreciated upon consideration of the following detailed description and the accompanying drawings, which set forth illustrative embodiments of the claimed subject matter.

BRIEF DESCRIPTION OF THE DRAWINGS

FIG. 4 illustrates an embodiment of ancillary data packet bit rate adjustment for a time reduced video signal.

DETAILED DESCRIPTION

Figure 1:
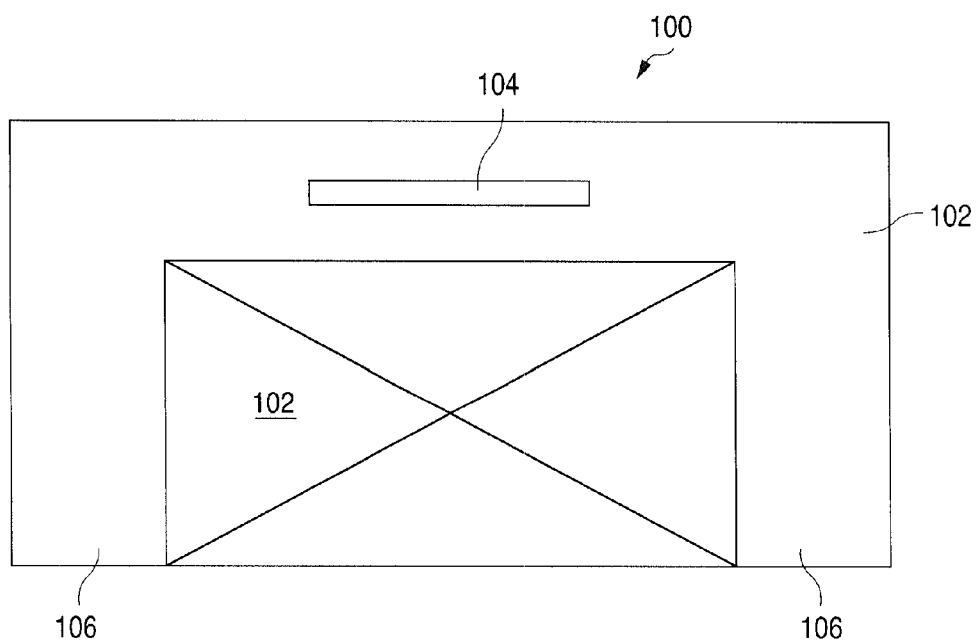
FIG. 1 illustrates an embodiment of conventional serial digital (SD) video frame format.

FIG. 1 shows an embodiment of a typical serial digital (SD) video frame format 100. The video frame 100 includes video data 102, Vertical Ancillary (VANC) data 102, which may include, for example, a CEA-708 closed caption or teletext packet 104, and Horizontal Ancillary (HANC) data 106.

Embedded ancillary data relevant to the present invention typically may be, but is not limited to, the Vertical Ancillary (VANC) data packets and includes text material based on US and other standards for closed captions and subtitles. It is noted that some text based material may also be found in the Horizontal Ancillary (HANC) packets to further describe video/audio signals. The embodiment described below is directed to how embedded ancillary data in a VANC packet is detected, processed and coupled with a time-reduced video signal. Those skilled in the art will appreciate that the concepts disclosed herein are equally applicable to a time-expanded video signal.

Figure 2:
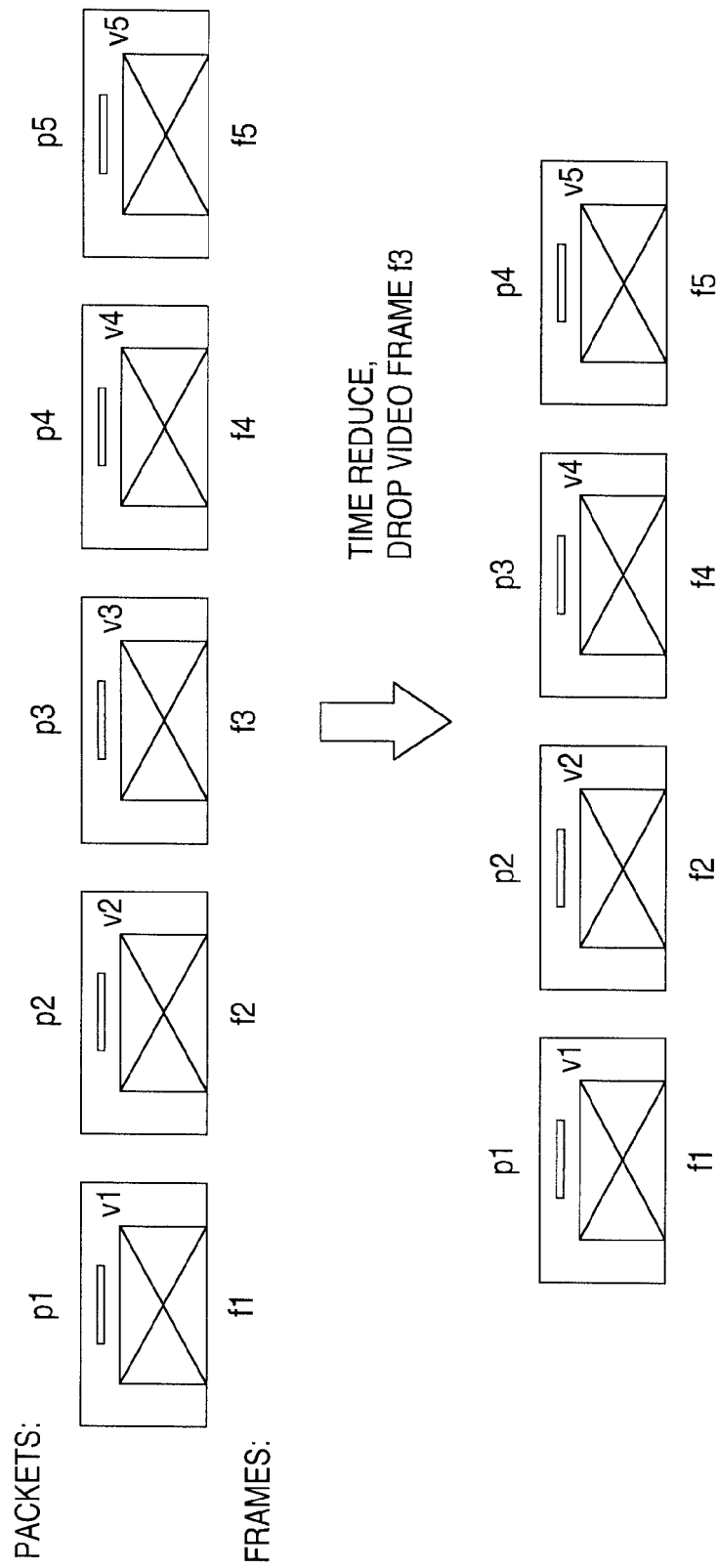
FIG. 2 illustrates an embodiment of time reduction of a video signal.

In the disclosed embodiment, CEA-708 captions arrive at a video/audio signal processing system for editing both the video signal and the audio signals to either reduce or expand the video/audio signal run time. FIG. 2 illustrates time reduction of the video signal comprising a sequence of frames f1-f5 by dropping frame f3 to provide a time-reduced frame sequence comprising original frames f1, f2, f4 and f5. As stated above, an example of such a video/audio signal processing system is the Time Tailor system, which is commercially available from Prime Image. It is well known that the Time Tailor system is adapted to make appropriate modifications to the corresponding audio signal to compensate for the dropping of frame f3 from the video frame sequence. The CEA-708 captions arrive at the Time Tailor system as VANC data packets embedded within the arriving video signal, as shown in FIG. 1. The VANC data packet includes several sections, including but not limited to headers, footers, payload, cycle counts for error detection, and optional time code (as defined by the CEA-708 specification). Identification of the ancillary data packets is by means of predefined IDs produced by industry groups such as, for example, the Society of Motion Picture and Television Engineers (SMPTE).

Figure 3:
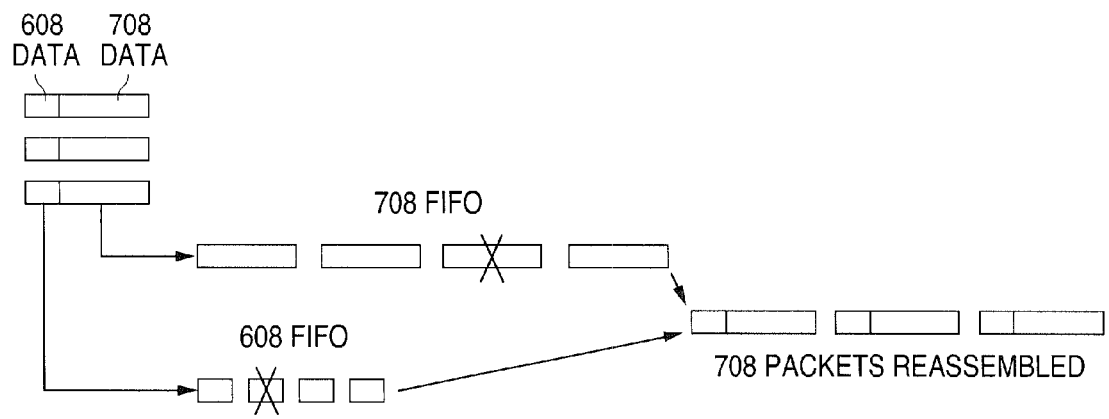
FIG. 3 illustrates an embodiment of ancillary data packet adjustment for a time reduced video signal.

Referring to FIG. 3, conventional circuitry now included in the Time Tailor extracts the payload section of the 708 packet prior to time reduction, which, as shown in FIG. 3, contains both HD and SD caption data. The data is then separated into the HD and SD components. Note that the processing technique does not "decode" captions, but merely moves the encoded data around.

As discussed in greater detail below, the packet of HD data from the payload is analyzed for active caption information, where "active" refers to data that result in a caption as opposed to data that are used as place holders. If any byte is active data, then the entire chunk is pushed into a FIFO memory. If no bytes are active, then the entire chunk is discarded. The SD data from the payload is processed in a similar way, except that more filtering is applied to discern caption data from redundant data, such as V-chip information or program descriptors.

The video signal is processed through the Time Tailor system with the original 708 packet. As the video signal is time-reduced, occasional frames and their associated 708 packets will be deleted, as shown in FIG. 2. The 708 payload data is not lost, however, because a copy of it was already pushed into the FIFO as discussed above. After the time reduction process, caption data is pulled from the FIFO and used to over-write the existing payload data of the video signal's time reduced packets. If the FIFO is empty, a chunk of inactive data is used to over-write the payload data.

Thus, in the disclosed embodiment, if the video frame is not deleted, then the exact same payload passes through the video path and the FIFO and the video's 708 packet does not change. If a video frame is deleted, then the FIFO's data is not read out, effectively delaying the data by one frame. The delayed FIFO data is then used to over-write the following frame's packet data, and so on, until the FIFO becomes empty. This technique preserves all active caption data during time reduction and only eliminates non-data.

As mentioned above, FIGS. 2-4 depict five frames (fi-f5) containing video data (v1-v5, respectively) and VANC caption/subtitle packets (p1-p5, respectively). In the time reduction process performed by the Time Tailor, frame f3 is dropped together with video data v3, leaving sequential frames f1, f2, f4 and f5. To avoid dropping the caption/subtitle packets, they are buffered and effectively "time shifted" so that packet p3, which has been preserved, is now associated with frame f4 and packet p4 is now associated with frame f5, and so on. This ability to time shift the caption/subtitle data allows a further process, described below, to locate packets of caption/subtitle data that can be discarded and which did not coincide with the video frame that was dropped. The result is time-reduced caption/subtitles without loss and remaining in synchronization with the video signal.

Referring to FIG. 4, caption/subtitle data usually has a fixed bandwidth in which to convey text information. The bandwidth is determined by the broadcast system being used, and may be different throughout the world. The bandwidth limit allows N number of data bytes per frame, which is equivalent to the bit rate during transmission. Time reduction of caption/subtitle data is possible because typically less than 100% of the available bandwidth is used. This unused bandwidth is usually "filled" with null codes or place holders, as shown in FIG. 4. As further shown in FIG. 4, by discarding these null codes, the same amount of "active" caption/subtitle data may now be conveyed in a shorter amount of time, thus time reducing the caption data. In FIG. 4, the original caption/subtitle transmission took twenty-five bytes; after time reduction, the same exact caption/subtitle message transmission took only twenty bytes.

In some instances, non-caption/subtitle data is used to fill up the unused bandwidth. In this event, a filter must be used to separate caption/subtitle data from "other" data. Time reduction is performed by only discarding "other" data as needed, thus preserving the caption/subtitles.

It should be understood that the particular embodiments of the subject matter described above have been provided by way of example and that other modifications may occur to those skilled in the art without departing from the scope of the claimed subject matter as expressed by the appended claims and their equivalents.

What is claimed is:

1. A method of maintaining ancillary data included in an original video signal in a corresponding time-altered video signal, the original video signal having an original run time, the ancillary data having an original bit rate, the method comprising:
    altering the original run time of the original video signal by removing at least one frame from the original video signal to provide the corresponding time-altered video signal;
    extracting and storing a copy of the ancillary data corresponding to each frame included in the original video signal;
    if the ancillary data corresponding to the removed frame includes active data, then writing the stored copy of the ancillary data for the removed frame onto a next frame of the time-altered video signal; and
    if the ancillary data corresponding to the removed frame does not include active data, then discarding the stored copy of the ancillary data for the removed frame.

2. The method of claim 1, wherein the embedded ancillary data associated with each video frame comprises a Vertical Ancillary (VANC) data packet.

3. The method of claim 1, wherein the embedded ancillary data comprises caption data.

4. The method of claim 1, wherein the embedded ancillary data comprises subtitle data.

5. The method of claim 1, wherein the embedded ancillary data comprises teletext data.

6. A method of maintaining ancillary data included in an original video signal in a corresponding time-reduced video signal, the original video signal having an original run time, the video signal comprising an original sequence of video frames, each video frame in the sequence of video frames including embedded ancillary data, the embedded ancillary data having an original bit rate, the method comprising:
    time-reducing the original run time of the original video signal by deleting one or more video frames from the original sequence of video frames;
    extracting and storing a copy of the embedded ancillary data included in each video frame in the original sequence of video frames;
    if the ancillary data corresponding to the deleted frame includes active data, then writing the stored copy of the ancillary data for the deleted frame onto a next frame of the time-altered video signal; and
    if the ancillary data corresponding to the deleted frame does not include active data, then discarding the stored copy of the ancillary data for the deleted frame.

7. The method of claim 6, wherein the embedded ancillary data associated with each video frame comprises Vertical Ancillary (VANC) data.

8. The method of claim 6, wherein the embedded ancillary data associated with each video frame comprises Horizontal Ancillary (HANC) data.

9. The method of claim 6, wherein the embedded ancillary data comprises caption data.

10. The method of claim 6, wherein the embedded ancillary data comprises subtitle data.

11. The method of claim 6, wherein the embedded ancillary data comprises teletext data.

12. A system for maintaining ancillary data included in an original video signal in a corresponding time-altered video signal, the original video signal having an original run time, the ancillary data having an original bit rate, the system comprising:
- a video signal processor that alters the original run time of the original video signal by removing at least one frame from the original video signal to provide the corresponding time-altered video signal;
- an ancillary data extraction and storage system that extracts and stores a copy of the ancillary data included in each frame of the original video signal; and
- an ancillary data processor that writes the stored copy of the ancillary data for the removed frame onto a next frame of the time-altered video signal if the ancillary data corresponding to the removed frame includes active data, and discarding the stored copy of the ancillary data for the removed frame if the ancillary data corresponding to the removed frame does not include active data.

13. The system of claim 12, wherein the embedded ancillary data associated with each video frame comprises a Vertical Ancillary (VANC) data packet.

14. The system of claim 12, wherein the VANC data packet comprises caption data.

15. The system of claim 12, wherein the VANC packet comprises CEA-708 caption data.

16. A method for retaining ancillary data in a time-altered video signal, comprising:
- receiving, by a processor, an original video signal having a plurality of frames, each frame having an ancillary data packet corresponding thereto and embedded therein;
- determining, by the processor, if the ancillary data packet of a selected frame includes active data;
- extracting, by the processor, a copy of the ancillary data packet from the selected frame of the original video signal, and storing in a memory by the processor the copy of ancillary data packet if it includes active data, or discarding by the processor the copy of the ancillary data packet is if does not include active data;
- altering, by the processor, the run-time of the original video signal to generate a time-altered video signal by deleting at least one frame;
- if a frame is deleted from the time-altered video signal, and the corresponding ancillary data packet includes active data, then writing by the processor the stored copy of the ancillary data packet from the memory onto a next frame in the time-altered video signal; and
- if a frame is deleted from the time-altered video signal, and the corresponding ancillary data packet does not include active data, then discarding by the processor the stored copy of the ancillary data packet.

* * * * *